(12) United States Patent
Nehete et al.

(10) Patent No.: US 11,174,422 B2
(45) Date of Patent: Nov. 16, 2021

(54) SALT-FREE INVERT EMULSIONS FOR USE IN SUBTERRANEAN FORMATION OPERATIONS

(71) Applicant: Halliburton Energy Services, Inc., Houston, TX (US)

(72) Inventors: Umesh Namdeo Nehete, Pune (IN); Mohamed Abdel Salam, Pune (IN); Sanjay Kumar Premnarayan Mishra, Pune (IN); Sharad Bhimrao Gotmukle, Udgir (IN)

(73) Assignee: Halliburton Energy Services, Inc., Houston, TX (US)

( * ) Notice: Subject to any disclaimer, the term of this patent is extended or adjusted under 35 U.S.C. 154(b) by 186 days.

(21) Appl. No.: 15/761,794

(22) PCT Filed: Oct. 27, 2015

(86) PCT No.: PCT/US2015/057458
§ 371 (c)(1),
(2) Date: Mar. 20, 2018

(87) PCT Pub. No.: WO2017/074306
PCT Pub. Date: May 4, 2017

(65) Prior Publication Data
US 2018/0265762 A1    Sep. 20, 2018

(51) Int. Cl.
*C09K 8/36* (2006.01)
*C09K 8/34* (2006.01)

(52) U.S. Cl.
CPC ............. *C09K 8/36* (2013.01); *C09K 8/34* (2013.01); *C09K 2208/28* (2013.01)

(58) Field of Classification Search
CPC .................................. C09K 8/34; C09K 8/36
See application file for complete search history.

(56) References Cited

U.S. PATENT DOCUMENTS

| | | |
|---|---|---|
| 4,508,628 A | 4/1985 | Walker et al. |
| 4,528,104 A | 7/1985 | House et al. |
| H1611 H | 11/1996 | Patel |
| 6,291,405 B1 | 9/2001 | Lee et al. |
| 6,793,025 B2 | 9/2004 | Patel et al. |
| 7,956,014 B2 | 6/2011 | Merli et al. |

(Continued)

FOREIGN PATENT DOCUMENTS

WO    WO-2013012577 A1    1/2013

OTHER PUBLICATIONS

Jha et al., "Emulsion Based Drilling Fluids: An Overview," International Journal of ChemTech Research, Jul.-Aug. 2014, vol. 6, No. 4, pp. 2306-2315.

(Continued)

*Primary Examiner* — Aiqun Li
(74) *Attorney, Agent, or Firm* — Tenley Krueger; C. Tumey Law Group PLLC

(57) ABSTRACT

Salt-free invert emulsions having an external phase comprising a hydrocarbon fluid, and an internal phase comprising a hygroscopic fluid selected from the group consisting of an amino alcohol, a glycol, an amine glycol, and any combination thereof. Methods including introducing the salt-free invert emulsion into a subterranean formation and performing a subterranean formation operation.

20 Claims, 1 Drawing Sheet

(56) References Cited

U.S. PATENT DOCUMENTS

| | | | |
|---|---|---|---|
| 2009/0270280 A1* | 10/2009 | Zhang | C09K 8/36 |
| | | | 507/211 |
| 2010/0193244 A1 | 8/2010 | Hoskins | |
| 2010/0274546 A1* | 10/2010 | Zafari | E21B 37/00 |
| | | | 703/10 |
| 2014/0066338 A1 | 3/2014 | Wagle et al. | |
| 2014/0090896 A1 | 4/2014 | Wagle et al. | |
| 2014/0148366 A1 | 5/2014 | Reyes Bautista et al. | |
| 2014/0357536 A1 | 12/2014 | Maghrabi et al. | |

OTHER PUBLICATIONS

Maghrabi et al., "Eco-friendly invert emulsion fluid retains wellbore stability," Drilling Conctractor, 2013, retrieved from http://www.drillingcontractor.org/eco-friendly-invert-emulsion-fluid-retains-wellbore-stability-24185, 7 pages.

Maghrabi et al., "Making Good HP/HT Invert Emulsion Drilling Fluids Great and Green," American Association of Drilling Engineers, AADE-13-FTCE-16, 2013, 9 pages.

International Search Report and Written Opinion from PCT/US2015/057458, dated May 13, 2016, 8 pages.

* cited by examiner

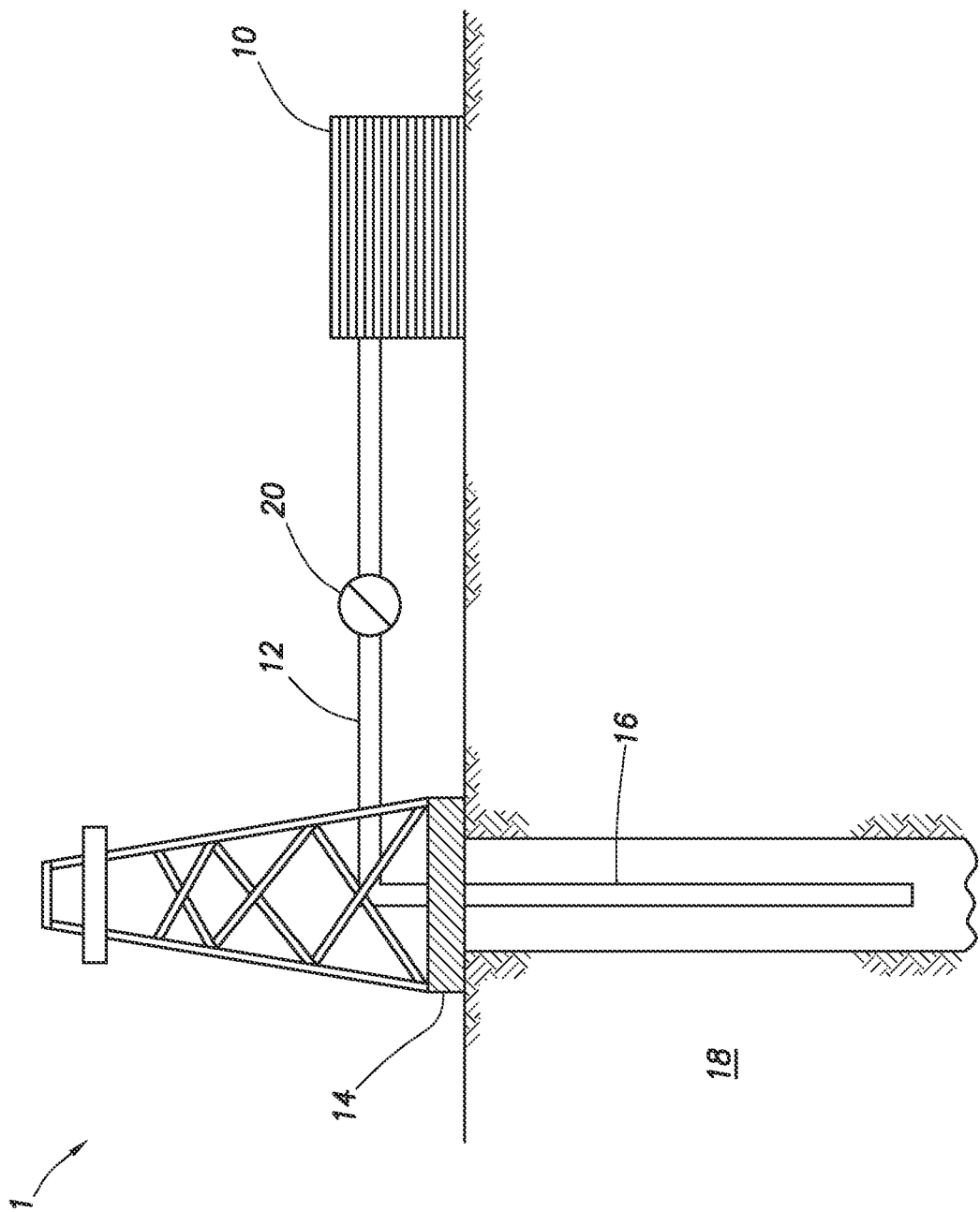

SALT-FREE INVERT EMULSIONS FOR USE IN SUBTERRANEAN FORMATION OPERATIONS

BACKGROUND

The embodiments herein relate generally to subterranean formation operations and, more particularly, to salt-free invert emulsions for use in subterranean formation operations.

Hydrocarbon producing wells are typically formed by drilling a wellbore into a subterranean formation. A "drilling fluid" or mud is a specially designed fluid that is circulated through a drill bit within a wellbore as the wellbore is being drilled. The drilling fluid is circulated back to the surface of the wellbore with drill cuttings for removal therefrom. The drilling fluid maintains a specific, balanced hydrostatic pressure within the wellbore, permitting all or most of the drilling fluid to be circulated back to the surface. Additionally, among other things, the drilling fluid facilitates cooling and lubricating the drill bit, aiding in support of the drill pipe and drill bit, and providing a hydrostatic head to maintain the integrity of the wellbore walls and prevent well blowouts.

Invert emulsion drilling fluids are often used in a drilling operation, as they offer improved attributes over other drilling fluids. As used herein, the term "invert emulsion" refers to an emulsion in which oil is the continuous or external phase and a non-oil fluid is the internal phase. Such attributes include, but are not limited to, favorable rheological flow profiles, favorable lubricating characteristics, favorable use under varying temperature and pressure conditions, and improved ecological loads on the environment compared with many drilling fluids. Such invert emulsion drilling fluids must be specifically designed based on the particular subterranean formation being drilled, taking into account a number of factors including, but not limited to, low-end rheology to provide suspension for weighting agents and drill cuttings, low plastic viscosity (PV) to limit equivalent circulating density, high yield point (YP) to plastic viscosity ratio for improved wellbore cleaning, sag resistance, wellbore stability, and performance in high temperature and/or high pressure conditions.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the salt-free invert emulsion fluids of the embodiments described herein to a downhole location, according to one or more embodiments of the present disclosure.

DETAILED DESCRIPTION

The embodiments herein relate generally to subterranean formation operations and, more particularly, to salt-free invert emulsions for use in subterranean formation operations.

The embodiments of the present disclosure involve the use of a salt-free invert emulsion fluid for use in performing a subterranean formation operation, such as a drilling operation. The salt-free invert emulsion has an internal phase comprising a hygroscopic fluid, and an external phase comprising a hydrocarbon fluid. As used herein, the term "hygroscopic fluid" refers to a substance able to attract and hold water molecules from a surrounding environment. The salt-free invert emulsions described herein are environmentally friendly, can be clay-free or comprise an organophilic clay, without reducing the desirable attributes of the salt-free invert emulsion, and exhibit enhanced or equivalent recovery during drilling operations compared to traditional invert emulsion fluids.

Traditionally, the internal phase of an invert emulsion drilling fluid is a brine solution. As an example of a recent invert emulsion drilling fluid formulation, glycerol has been used as the internal phase (at 60%) to achieve certain desirable rheological and stability attributes, where such emulsions are salt-free and clay-free. The glycerol invert emulsions do not achieve desirable drilling operation attributes, however, in the presence of clay.

The hygroscopic internal phase salt-free invert emulsions of the present disclosure beneficially allow the use of either clay-free or clay-based formulations that exhibit a number of attributes equivalent or above those of the brine and glycerol invert emulsions. Such attributes include, but are not limited to, high water activity at high temperatures, shale retention of greater than about 95%; stable fluid properties such as oil separation, desirable PV and YP, desirable high temperature high pressure (HTHP) fluid loss; sag resistance, and the like. Accordingly, the salt-free invert emulsions of the present disclosure result in improved overall fluid emulsion stability, as well as shale stability, including in the presence of organophilic clay. Moreover, the salt-free invert emulsions are environmentally friendly, thus reducing harm to the environment and operators, as well as reducing costs associated with handling, disposal, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a method of introducing a salt-free invert emulsion into a subterranean formation and performing a subterranean formation operation. As used herein, the term "subterranean formation" or simply "formation" includes any geological formation in which hydrocarbons may reside including, but not limited to, low-permeability and ultra-low permeability geological formations. The "permeability" of a formation is a measure of the formation's resistance to through-flow fluid. As used herein, the term "low-permeability formation," and grammatical variants thereof, refers to a formation that has a matrix permeability of less than 1,000 microdarcy (equivalent to 1 millidarcy). As used herein, the term "low-permeability formation" encompasses "ultra-low permeability formations," and grammatical variants thereof, which refers to a formation that has a matrix permeability of less than 1 microdarcy (equivalent to 0.001 millidarcy).

Examples of such low-permeability formations include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19}$ m$^2$), and even as low as less than about 0.0001 mD ($9.869233 \times 10^{-20}$ m$^2$). Tight-gas sands are low permeability formations that produce mainly dry natural gas and include tight-gas carbonates, tight-gas shales, coal-bed methane, tight sandstones, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

The salt-free invert emulsions of the present disclosure have an external phase comprising a hydrocarbon fluid, and an internal phase comprising a hygroscopic fluid selected from the group consisting of an amino alcohol, a glycol, an amine glycol, and any combination thereof. Although the salt-free invert emulsion described herein may be used to perform any subterranean formation operation in which an invert emulsion is suitable, the embodiments herein relate in particular to drilling operations for forming wellbores in subterranean formations for hydrocarbon recovery.

The various hygroscopic fluids for use in forming the internal phase of the salt-free invert emulsions described herein, as previously stated, may be an amino alcohol, a glycol, an amine glycol, and any combination thereof. Examples of suitable amino alcohols include, but are not limited to, a diethanol amine, a n-methyl diethanol amine, methanol amine, ethanolamine, propanol amine, any derivative thereof, and any combination thereof. As used herein, the term "derivative" means a compound that is made from one of the listed compounds, for example, by replacing one atom in one of the listed compounds with another atom or group of atoms, ionizing one of the listed compounds, or creating a salt of one of the listed compounds. In preferred embodiments, the derivatives of the amino alcohols are a long chain aliphatic derivative and/or a long chain aromatic derivative having at least one heteroatom. As used herein, the term "long chain" refers to a compound having at least two carbon atoms. In some embodiments, the long chain amino alcohol derivatives have between about 2 carbon atoms and about 6 carbon atoms, encompassing any value and subset therebetween. For example, the long chain amino alcohol may be about 2 to about 3, or about 3 to about 4, or about 4 to about 5, or about 5 to about 6, or about 3 to about 5 carbon atoms, encompassing any value and subset therebetween. The term "heteroatom," as used herein, means an atom in a compound replacing (i.e., different than) a carbon atom, the compound being cyclic, linear, aliphatic, or aromatic. Non-limiting examples of heteroatoms include, but are not limited to, nitrogen, oxygen, sulfur, phosphorous, and the like, and any combination thereof.

The glycol for use as the hygroscopic fluid in forming the internal phase of the salt-free invert emulsion includes, but is not limited to, triethylene glycol, diethylene glycol, propylene glycol, butylene glycol, an amine glycol (e.g., multi-arm dihydroxy polyether amine), any derivative thereof, and any combination thereof. As with the amino alcohols, in preferred embodiments, the derivatives are long chain aliphatic and/or long chain aromatic derivatives having at least one heteroatom. The amine glycol for use as the hygroscopic fluid in forming the internal phase of the salt-free invert emulsion include, but are not limited to, an alkanolamine, a polyol substituted amine derivative (e.g., an alkoxypolyol amine), and any combination thereof.

The internal phase of the salt-free invert emulsions (the oil-to-water ratio) described in the present disclosure is from about 1% to about 50% by volume of the total salt-free invert emulsion, encompassing any value and subset therebetween. For example, the internal phase of the salt-free invert emulsion may be about 1% to about 10%, or about 10% to about 20%, or about 20% to about 30%, or about 30% to about 40%, or about 40% to about 50%, or about 5% to about 45%, or about 10% to about 40%, or about 15% to about 35%, or about 20% to about 30% by volume of the total salt-free invert emulsion, encompassing any value and subset therebetween. Each of these values is critical to the embodiments of the present disclosure and depend on a number of factors including, but not limited to, the desired rheology of the emulsion, the type of hygroscopic fluid selected for the internal phase, the type of hydrocarbon selected for the external phase, the type of subterranean formation, and the like, and any combination thereof.

The hygroscopic fluid in the internal phase of the salt-free invert emulsion may be diluted with an aqueous fluid of fresh water such that it is present in the internal phase in an amount of from about 50% to about 75% by volume of the internal phase of the salt-free invert emulsion, encompassing any value and subset therebetween. For example, the hygroscopic fluid may be present from about 50% to about 54%, or about 54% to about 58%, or about 58% to about 62%, or about 62% to about 66%, or about 66% to about 70%, or about 52% to about 68%, or about 54% to about 66%, or about 56% to about 64%, or about 58% to about 62%, or about 50% to about 70%, or about 70% to about 75%, or about 55% to about 70% by volume of the internal phase of the salt-free invert emulsion, encompassing any value and subset therebetween. Each of these values is critical to the embodiments of the present disclosure and depend on a number of factors including, but not limited to, the desired rheology of the emulsion, the type of hygroscopic fluid selected for the internal phase, the type of hydrocarbon selected for the external phase, the type of subterranean formation, and the like, and any combination thereof. As used herein, the term "fresh water" refers to water with less than 500 parts per million of dissolved salts, and preferably even less to ensure that the salt-free invert emulsion described herein is not adversely affected. The fresh water may be obtained from any source including, but not limited to, tap water, deionized water, a natural source (e.g., ice sheets, ice caps, glaciers, rivers, icebergs, ponds), and the like. The fresh water may be additionally be obtained by treating non-fresh water sources.

In some embodiments, as previously mentioned, the salt-free invert emulsions of the present disclosure may include an organophilic clay. Additionally, the salt-free invert emulsions of the present disclosure may include an organophilic lignite. The organophilic clay and/or lignite may be present in the salt-free invert emulsion distributed throughout both phases. Although the organophilic clay and/or lignite is distributed throughout both phases, it may be evenly distributed or be in a greater amount in either phase, without departing from the scope of the present disclosure. As used herein, the term "organophilic clay" refers to any clay material that has been modified with a chemical to make it oil-dispersible. The term "organophilic lignite," as used herein, refers to any lignite material that has been modified with a chemical to make it oil-dispersible. An example of a chemical that can be used to form the organophilic clay and/or lignite is a quaternary amine. Examples of suitable organophilic clays include, but are not limited to, organophilic bentonite (e.g., dimethyldioctadecyl ammonium bentonite, dimethylbenzyloctadecyl ammonium bentonite, cocoamine bentonite), organophilic hectorite (e.g., disteardimonium hectorite), organophilic montmorillonite, organophilic attapulgite, and any combination thereof. A suitable commercially available organophilic clay includes, but is not limited to, SUSPENTONE™, an organophilic clay suspension agent available from Halliburton Energy Services, Inc; and BENTONE® 38, an organically modified hectorite clay available from Elementis PLC in London, United Kingdom.

In some embodiments, the organophilic clay and/or the organophilic lignite is included in the salt-free invert emulsion in an amount of about 0.1 pounds per barrel (ppb) to about 15 ppb of the liquid portion of the salt-free invert emulsion, encompassing any value and subset therebetween. One barrel is equivalent to 42 gallons, and one ppb is equivalent to 2.853 kilograms per cubic meter. For example, the organophilic clay and/or the organophilic lignite may be in the salt-free invert emulsion of about 0.1 ppb to about 1 ppb, or about 1 ppb to about 3 ppb, or about 3 ppb to about 6 ppb, or about 6 ppb to about 9 ppb, or about 9 ppb to about 12 ppb, or about 12 ppb to about 15 ppb, or about 1 ppb to about 15 ppb, or about 3 ppb to about 12 ppb, or about 6 ppb to about 9 ppb, encompassing any value and subset therebetween. Each of these values is critical to the embodiments of the present disclosure and depends on a number of factors including, but not limited to, the desired rheology of the salt-free invert emulsion, the type of organophilic clay and/or organophilic lignite selected, the type of hygroscopic fluid forming the salt-free invert emulsion, the type of hydrocarbon fluid forming the salt-free invert emulsion, and any combination thereof.

The hydrocarbon for forming the external phase of the salt-free invert emulsions of the present disclosure may be any compound containing only hydrogen and carbon, which is capable of forming the salt-free invert emulsion described herein and for use in a subterranean formation operation (e.g., a drilling operation). Examples of such hydrocarbons include, but are not limited to, alkanes, olefins, aromatic organic compounds, cyclic alkanes, paraffins, diesel fluids, mineral oils, desulfurized hydrogenated kerosenes, and any combination thereof. An example of a suitable commercially available hydrocarbon includes ESCAID™ Hydrocarbon Fluids (e.g., ESCAID™ 110), available from ExxonMobil Corporation in Irving, Tex.

In some embodiments, the salt-free invert emulsions described herein further include an additive including, but not limited to, an emulsifier, lime, a filtration control agent, a viscosifying agent, a suspension agent, a weighting agent, a fluid loss control agent, a polymeric sag-control agent, and any combination thereof. Examples of suitable commercially available additives include, but are not limited to, the following available from Halliburton Energy Services in Houston, Tex.: EZ MUL® NT, a polyaminated fatty acid emulsifier; RHEMOD™ L, a liquid viscosifying agent; TAU-MOD®, a fibrous viscosifier; ADAPTA®, a cross-linked polymeric filtration control agent; BDF-566, a polymeric sag-control agent; BAROID®, a barium sulfate weighting agent; and BDF-570, a fatty dimer diamine suspension agent. Additional additives that can be included in the salt-free invert emulsions of the present disclosure include, but are not limited to, an inert solid, a dispersion aid, an emulsion thinner, an emulsion thickener, a surfactant, a lost circulation material, a foaming agent, a gas, an alkalinity control additive, a crosslinker, a stabilizer, a scale inhibitor, a friction reducer, a clay stabilizing agent, and any combination thereof.

In various embodiments, systems configured for delivering the salt-free invert emulsions (referred to simply as "fluids" below) described herein to a downhole location are described. In various embodiments, the systems can comprise a pump fluidly coupled to a tubular, the tubular containing the fluids described herein. It will be appreciated that while the system described below may be used for delivering either or both of the treatment fluid and/or proppant fluid, each fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the micro-sized proppant particulates and/or the micro-sized proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

FIG. 1 shows an illustrative schematic of a system that can deliver the treatment fluids (i.e., the high-viscosity pad fluid and the low-viscosity micro-proppant fluid, macro-proppant fluid, and diversion fluid) of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid or a portion thereof (e.g., the broken fluid) may, in some embodiments, flow back to wellhead 14 and exit subterranean formation 18. In some embodiments, the fluid that has flowed back to wellhead 14 may subsequently be recovered and recirculated to subterranean formation 18, or otherwise treated for use in a subsequent subterranean operation or for use in another industry.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A method comprising: introducing a salt-free invert emulsion into a subterranean formation, wherein the salt-free invert emulsion has an external phase comprising a hydrocarbon fluid, and an internal phase comprising a hygroscopic fluid selected from the group consisting of an amino alcohol, a glycol, an amine glycol, and any combination thereof; and performing a subterranean formation operation.

Embodiment B

A salt-free invert emulsion comprising: an external phase comprising a hydrocarbon fluid; and an internal phase comprising a hygroscopic fluid selected from the group consisting of an amino alcohol, a glycol, an amine glycol, and any combination thereof.

Embodiment C

A system comprising: a pump coupled to a tubular, the tubular extending from a wellhead and into a subterranean formation; and a salt-free invert emulsion contained in the tubular, the salt-free invert emulsion having an external phase comprising a hydrocarbon fluid, and an internal phase comprising a hygroscopic fluid selected from the group consisting of an amino alcohol, a glycol, an amine glycol, and any combination thereof.

Each of Embodiments A, B, and C may have one or more of the following additional elements in any combination:

Element 1: Wherein the amino alcohol is selected from the group consisting of diethanol amine, n-methyl diethanol amine, any derivative thereof, and any combination thereof.

Element 2: Wherein the glycol is selected from the group consisting of triethylene glycol, diethylene glycol, any derivative thereof, and any combination thereof.

Element 3: Wherein the amine glycol is selected from the group consisting of an alkanolamine, a polyol substituted amine derivative, and any combination thereof.

Element 4: Wherein the hygroscopic fluid is about 50% to about 75% by volume of the internal phase of the salt-free invert emulsion.

Element 5: Wherein salt-free invert emulsion further comprises an organophilic clay or organophilic lignite.

Element 6: Wherein the salt-free invert emulsion further comprises an additive selected from the group consisting of an emulsifier, lime, a filtration control agent, a viscosifying agent, a suspension agent, a weighting agent, a polymeric sag-control agent, and any combination thereof.

Element 7: Wherein the salt-free invert emulsion is introduced into a subterranean formation and a subterranean formation operation is performed, and wherein the subterranean formation operation is a drilling operation.

By way of non-limiting example, exemplary combinations applicable to A, B, and C include: 1-7; 1, 2, and 5; 1 and 6; 3, 4, and 6; 4 and 7; 2 and 6; 3, 5, 6, and 7; 2 and 3; 4 and 6; 5, 6, and 7; and the like.

To facilitate a better understanding of the embodiments of the present disclosure, the following examples of preferred or representative embodiments are given. In no way should the following examples be read to limit, or to define, the scope of the present disclosure.

Example 1

In this example, the water activity of various hygroscopic fluids used as the internal phase of a salt-free invert emulsion as described herein were compared to traditional or known invert emulsion fluids comprising either a brine internal phase or a glycerol internal phase. The "water activity" or "$a_w$") is the partial vapor pressure of water in a substance divided by the standard state partial vapor pressure of water. Maintaining a particular water activity during a drilling operation creates an osmotic pressure that drives flow of water from a formation (e.g., from shale) to the invert emulsion fluid, thus preventing hydration of the formation.

The hygroscopic fluid included diethylene glycol, triethylene glycol, diethanol amine, and n-methyl diethanol amine. Various amounts of hygroscopic fluid percentages by volume of the internal phase were tested of 40%, 50%, 60%, 70%, 80%, 90% and 95% and 100% for the traditional brine and glycerol substances. Each of the fluids further had an oil-to-water ratio ("OWR") of 70:30. The remaining percentage of internal phase that was not a hygroscopic fluid consisted of fresh water. As shown, the water activity of typical glycerol and brine invert emulsions for use in subterranean formation operations is identical or generally improved when using the hygroscopic fluids of the present disclosure, as shown in Table 1. Thus, substitution of the hygroscopic fluids with the brine or glycerol internal phase can occur without affecting water activity. The symbol "--" indicates that the particular internal phase volume was not evaluated. The parts per million of salt concentration ("ppm") in the $CaCl_2$ brine is shown between 200 thousand ("K") ppm and 340 K ppm.

Example 2

In this example, several salt-free invert emulsion fluids prepared according to the embodiments described herein were evaluated for their rheology and shale erosion capacity. Three test fluids (TF1-3) were prepared. Each of the fluids was prepared using ESCAID® 110 Hydrocarbon Fluid as the external phase of the invert emulsion and either diethanol amine (TF1), n-methyl diethanol amine (TF2), or triethylene glycol (TF3).

TF1 comprised an 60% diethanol amine ("DEA") hygroscopic fluid internal phase by weight per weight ("w/w") of the TF1. TF2 comprised a 65% n-methyl diethanol amine ("N-MDEA") hygroscopic internal phase by w/w of the TF2. TF3 comprised a 65% triethylene glycol ("TRIGOL") internal phase by w/w of the TF3. Each of the fluids further had an oil-to-water ratio ("OWR") of 70:30. The remaining percentage of internal phase that was not a hygroscopic fluid consisted of fresh water. Moreover, additional additives were included in each of the salt-free invert emulsions according to Table 2. The mixing time (in minutes) shows when each of the additives was included into the fluids sequentially. Each of the additives is shown in pounds per barrel (ppb), where one barrel is equivalent to 42 gallons. "REV DUST™" is a finely ground altered calcium montmorillonite clay used to simulate drill cuttings, available from Baker Hughes in Houston, Tex.

TABLE 2

| Additive | Mixing Time | TF1 | TF2 | TF3 |
|---|---|---|---|---|
| ESCAID ® 110 | — | 146.1 | 146.1 | 146.1 |
| EZ MUL ® NT | 5 | 11 | 11 | 11 |
| RHEMOD ™ L | 5 | 1.5 | 1.5 | 1.5 |
| Lime | 5 | 1 | 1 | 1 |
| ADAPTA ® | 5 | 4 | 4 | 4 |
| BDF-566 | 5 | 3 | 3 | 3 |
| 60% DEA | 5 | 83.76 | — | — |
| 65% N-MDEA | 5 | — | 83.76 | — |
| 65% TRIGOL | 5 | — | — | 83.76 |
| REVDUST ™ | 5 | 20 | 20 | 20 |
| BAROID ® | 10 | 228.6 | 228.6 | 228.6 |

The rheology and shale retention characteristics of each of TF1, TF2, and TF3 was tested either before or after hot-

TABLE 1

| Internal Phase | Diethylene Glycol | Triethylene Glycol | Diethanol Amine | N-Methyl Diethanol Amine | Glycerol | $CaCl_2$ Brine |
|---|---|---|---|---|---|---|
| 40% | 0.909 $a_w$ | 0.909 $a_w$ | 0.922 $a_w$ | 0.901 $a_w$ | 0.872 $a_w$ | 200K 0.83 $a_w$ |
| 50% | 0.857 $a_w$ | 0.858 $a_w$ | 0.860 $a_w$ | 0.849 $a_w$ | 0.813 $a_w$ | 220K 0.80 $a_w$ |
| 60% | 0.816 $a_w$ | 0.791 $a_w$ | 0.767 $a_w$ | 0.789 $a_w$ | 0.737 $a_w$ | 240K 0.76 $a_w$ |
| 70% | 0.739 $a_w$ | 0.697 $a_w$ | 0.635 $a_w$ | 0.704 $a_w$ | 0.631 $a_w$ | 260K 0.72 $a_w$ |
| 80% | 0.644 $a_w$ | 0.588 $a_w$ | 0.553 $a_w$ | 0.601 $a_w$ | 0.491 $a_w$ | 280K 0.68 $a_w$ |
| 90% | 0.464 $a_w$ | 0.368 $a_w$ | 0.460 $a_w$ | 0.539 $a_w$ | 0.306 $a_w$ | 300K 0.64 $a_w$ |
| 95% | — | — | — | — | 0.182 $a_w$ | 320K 0.59 $a_w$ |
| 100% | — | — | — | — | 0.043 $a_w$ | 340K 0.55 $a_w$ | rolling ("BHR" and "AHR," respectively) at 150° F. (65.56° C.) for 16 hours. Using a FANN® 35A Viscometer (R1 rotor, B1 bob, and F1 torsion) at 120° F. (48.89° C.), measurements of the shear stress of the bob at shear rates between 3 rpm to 600 rpm (units: lb/100 ft$^2$) were taken and the plastic viscosity ("PV") (units: centipoise ("cP")) and the yield point ("YP") (units: lb/100 ft$^2$) were obtained. The PV is determined by subtracting the 300 rpm shear stress from the 600 rpm yield stress. The YP is determined by subtracting the PV from the 300 rpm shear stress. The low-shear yield point ("LSYP") was further determined by multiplying the 3 rpm shear stress by two (2) and subtracting the 6 rpm shear stress.

The 10 second (s) gel and 10 minute (min) gel were measured by allowing each test fluid to remain static for 10-sec or 10-min, respectively, and, then, measuring the maximum deflection at 3 rpm with the FANN® 35A Viscometer (units: lb/100 ft$^2$).

The electrical stability (units: volts) of each treatment fluid was measured using a FANN® Model 23E Electrical Stability Tester at 120° F. (48.89° C.) to evaluate the emulsion stability and oil-wetting capacity of the fluids.

Finally, a shale retention test was performed by crushing a portion of a particular shale formation into ground particles that are able to pass through a 5 U.S. Sieve mesh screen but are retained on a 10 U.S. Sieve mesh screen. Thereafter, 30 grams ("g") of the ground shale and 350 milliliters ("mL") of the test fluid are placed into a jar and hot-rolled as previously discussed. The test fluid is then screened through the 10 mesh screen and the retained solids are washed, dried, and weighted. The percent of erosion is calculated based on the weight loss of the ground shale, corrected for the moisture content of the original sample. The shale erosion value minus 100% corresponds to the shale retention value. A shale retention value of greater than or equal to 95% indicates a high shale retention value. The shale retention test is used to determine the ability of the test fluids and additives therein to prevent a shale formation from eroding. Such erosion, when encountered in actual field conditions can lead to problems including, sloughing, washouts, wellbore collapse, and the like.

Each of the rheology and shale retention test data are shown in Table 3.

TABLE 3

|  | TF1 | | TF2 | | TF3 | |
| --- | --- | --- | --- | --- | --- | --- |
|  | BHR | AHR | BHR | AHR | BHR | AHR |
| 600 rpm | 80 | 90 | 76 | 90 | 62 | 71 |
| 300 rpm | 47 | 52 | 45 | 54 | 35 | 40 |
| 200 rpm | 34 | 36 | 34 | 41 | 24 | 30 |
| 100 rpm | 21 | 24 | 21 | 27 | 15 | 19 |
| 6 rpm | 6 | 10 | 7 | 11 | 2 | 5 |
| 3 rpm | 5 | 8 | 6 | 9 | 1 | 4 |
| PV | 33 | 38 | 31 | 36 | 27 | 31 |
| YP | 14 | 14 | 14 | 18 | 8 | 9 |
| LSYP | 4 | 6 | 5 | 7 | 0 | 3 |
| 10-sec gel | 7 | 7 | 8 | 9 | 2 | 5 |
| 10-min gel | 14 | 25 | 18 | 34 | 13 | 20 |
| Electrical Stability | 476 | 501 | 232 | 450 | 182 | 270 |
| Shale Retention | — | 99.7% | — | 99.5% | — | 99.6% |

As shown, the test fluids exhibit excellent shale retention values as well as cutting integrity and stable rheological properties for use in a subterranean formation operation, such as a drilling operation in the absence of an organophilic clay and/or lignite.

Example 3

In this example, the salt-free invert emulsion fluid TF4 having a DEA internal phase was prepared according to Example 2 and having the composition provided in Table 4. TF4 was then evaluated for its rheological data, as described in Example 2, top oil separation, and high pressure, high temperature ("HPHT") filtration control (i.e., fluid loss) (units: mL).

TABLE 4

| Additive | Mixing Time | TF4 |
| --- | --- | --- |
| ESCAID ® 110 | — | 146.12 |
| EZ MUL ® NT | 5 | 11 |
| RHEMOD ™ L | 5 | 1.5 |
| Lime | 5 | 1 |
| ADAPTA ® | 5 | 4 |
| BDF-566 | 5 | 3 |
| TAU-MOD ® | 5 | 5 |
| 60% DEA | 5 | 83.76 |
| REVDUST ™ | 5 | 20 |
| BAROID ® | 5 | 228.61 |

The rheology data was measured before hot-rolling ("BHR"), after hot-rolling at 150° F. for 16 hours ("AHR"), and further after both hot-rolling at 150° F. and static aging at 250° F. for either 24 hours or 72 hours ("ASA, 24 hrs" and "ASA, 72 hrs," respectively. The top (i.e., separated) oil separation was determined by measuring the oil layer above the solids in the static aged TF4 (units: mL). Thereafter, the top oil was removed, and the density of the TF4 measured at two depths: top stratification and bottom stratification (units: specific gravity ("sg")). A "sag factor" was calculated by dividing the bottom density by the sum of the top and bottom densities.

The HPHT filtration control was determined using a FANN® HPHT Filter Press with an API standard filter paper (6.35 centimeter (cm) (i.e., 2.5 inch) diameter). Filtrate was collected in a graduated cylinder with the fluid sample held at 250° F. (121.11° C.) and 500 psi differential pressure for 30 minutes. The volume of fluid collected was multiplied by 2 to give the HPHT filtrate value (or fluid loss volume amount). The results are reported in Table 5.

TABLE 5

|  | TF4 | | | |
| --- | --- | --- | --- | --- |
|  | BHR | AHR | ASA, 24 hrs | ASA, 72 hrs |
| 600 rpm | 80 | 90 | 120 | 88 |
| 300 rpm | 47 | 52 | 79 | 58 |
| 200 rpm | 34 | 36 | 60 | 46 |
| 100 rpm | 21 | 24 | 39 | 32 |
| 6 rpm | 6 | 10 | 12 | 11 |
| 3 rpm | 5 | 8 | 10 | 8 |
| PV | 33 | 38 | 41 | 30 |
| YP | 14 | 14 | 38 | 28 |
| LSYP | 4 | 6 | 8 | 5 |
| 10-sec gel | 7 | 7 | 10 | 9 |
| 10-min gel | 14 | 25 | 37 | 37 |
| Electrical Stability | 476 | 501 | 439 | 40 |
| HPHT | — | — | — | 4.4 |
| Oil Separation | — | — | 2 | 19 |
| Top Stratification | — | — | 11.558 | 12.217 |
| Bottom Stratification | — | — | 12.451 | 12.601 |
| Sag Factor | — | — | 0.52 | 0.51 |

As shown, TF4 exhibited stable rheological properties for use in a subterranean formation operation, such as a drilling operation.

Example 4

In this example, the salt-free invert emulsion fluid TF5 having a N-MDEA internal phase was prepared according to Example 2 and having the composition provided in Table 6. TF4 was then evaluated for its rheological data, as described in Example 2, top oil separation, and HPHT filtration control, as described in Example 3.

TABLE 6

| Additive | Mixing Time | TF5 |
|---|---|---|
| ESCAID ® 110 | — | 146.12 |
| EZ MUL ® NT | 5 | 11 |
| RHEMOD ™ L | 5 | 1.5 |
| Lime | 5 | 1 |
| ADAPTA ® | 5 | 4 |
| BDF-566 | 5 | 3 |
| TAU-MOD ® | 5 | 5 |
| 65% N-MDEA | 5 | 83.76 |
| REVDUST ™ | 5 | 20 |
| BAROID ® | 5 | 228.61 |

The rheology data was measured before hot-rolling ("BHR"), after hot-rolling at 150° F. for 16 hours ("AHR"), and further after both hot-rolling at 150° F. and static aging at 250° F. for either 24 hours or 72 hours ("ASA, 24 hrs" and "ASA, 72 hrs," respectively, as reported in Table 7.

TABLE 7

| | TF5 | | | |
|---|---|---|---|---|
| | BHR | AHR | ASA, 24 hrs | ASA, 72 hrs |
| 600 rpm | 79 | 96 | 113 | 117 |
| 300 rpm | 46 | 59 | 70 | 81 |
| 200 rpm | 33 | 43 | 55 | 65 |
| 100 rpm | 21 | 29 | 40 | 47 |
| 6 rpm | 9 | 16 | 20 | 21 |
| 3 rpm | 8 | 14 | 18 | 18 |
| PV | 33 | 37 | 43 | 36 |
| YP | 13 | 22 | 27 | 45 |
| LSYP | 7 | 12 | 16 | 15 |
| 10-sec gel | 8 | 11 | 20 | 23 |
| 10-min gel | 18 | 37 | 41 | 39 |
| Electrical Stability | 245 | 426 | 450 | 372 |
| HPHT | — | — | — | 21 |
| Oil Separation | — | — | 2.0 | 10.5 |
| Top Stratification | — | — | 11.616 | 12.150 |
| Bottom Stratification | — | — | 12.334 | 12.551 |
| Sag Factor | — | — | 0.51 | 0.51 |

As shown, TF5 exhibited stable rheological properties for use in a subterranean formation operation, such as a drilling operation.

Example 5

In this example, the salt-free invert emulsion fluid TF6 having a trigol internal phase was prepared according to Example 2 and having the composition provided in Table 6. TF4 was then evaluated for its rheological data, as described in Example 2, top oil separation, and HPHT filtration control, as described in Example 3.

TABLE 8

| Additive | Mixing Time | TF6 |
|---|---|---|
| ESCAID ® 110 | — | 146.12 |
| EZ MUL ® NT | 5 | 11 |
| RHEMOD ™ L | 5 | 1.5 |
| Lime | 5 | 1 |
| ADAPTA ® | 5 | 4 |
| BDF-566 | 5 | 3 |
| TAU-MOD ® | 5 | 5 |
| 65% TRIGOL | 5 | 83.76 |
| REVDUST ™ | 5 | 20 |
| BAROID ® | 5 | 228.61 |

The rheology data was measured before hot-rolling ("BHR"), after hot-rolling at 150° F. for 16 hours ("AHR"), and further after both hot-rolling at 150° F. and static aging at 250° F. for either 24 hours or 72 hours ("ASA, 24 hrs" and "ASA, 72 hrs," respectively, as reported in Table 9.

TABLE 9

| | TF6 | | | |
|---|---|---|---|---|
| | BHR | AHR | ASA, 24 hrs | ASA, 72 hrs |
| 600 rpm | 62 | 71 | 86 | 90 |
| 300 rpm | 35 | 40 | 52 | 59 |
| 200 rpm | 24 | 30 | 40 | 46 |
| 100 rpm | 15 | 19 | 25 | 31 |
| 6 rpm | 2 | 5 | 12 | 6 |
| 3 rpm | 1 | 4 | 9 | 4 |
| PV | 27 | 31 | 34 | 31 |
| YP | 8 | 9 | 18 | 28 |
| LSYP | 0 | 3 | 6 | 2 |
| 10-sec gel | 2 | 5 | 6 | 7 |
| 10-min gel | 13 | 20 | 34 | 35 |
| Electrical Stability | 182 | 270 | 375 | 489 |
| HPHT | — | — | — | 4.4 |
| Oil Separation | — | — | 6.5 | 8.5 |
| Top Stratification | — | — | 12.100 | 12.142 |
| Bottom Stratification | — | — | 12.559 | 12.518 |
| Sag Factor | — | — | 0.51 | 0.51 |

As shown, TF6 exhibited stable rheological properties for use in a subterranean formation operation, such as a drilling operation.

Example 6

In this example, several salt-free invert emulsion fluids (TF7-8) prepared according to the embodiments described herein were evaluated for their rheology and shale erosion capacity, as compared to a traditional 13 lb/gal glycerol control fluid (CF1). Each of the fluids was prepared using ESCAID™ 110 Hydrocarbon Fluid as the external phase of the invert emulsion and 13 lb/gal of either diethanol amine (TF7) or triethylene glycol (TF8).

TF7 comprised a 60% diethanol amine ("DEA") hygroscopic internal phase by weight per weight ("w/w") of the TF7. TF8 comprised a 65% triethylene glycol ("TRIGOL") hygroscopic internal phase by w/w of the TF8. Each of the fluids further had an oil-to-water ratio ("OWR") of 70:30. The remaining percentage of internal phase that was not a hygroscopic fluid consisted of fresh water. Additional additives were also included, according to Table 10 below. As shown, unlike in Example 2, the test fluids of this example further comprise organophilic clay.

TABLE 10

| Additive | Mixing Time | CF1 | TF7 | TF8 |
|---|---|---|---|---|
| ESCAID ® 110 | — | 138 | 138 | 138 |
| EZ MUL ® NT | 5 | 12 | 12 | 12 |
| RHEMOD ™ L | 5 | 1 | 1 | 1 |
| Lime | 5 | 1.2 | 1.2 | 1.2 |
| ADAPTA ® | 5 | 6 | 6 | 6 |
| SUSPENTONE ™ | 5 | 2 | 2 | 2 |
| BENTONE ® 38 | 5 | 2.5 | 2.5 | 2.5 |
| 60% Glycerol | 5 | — | 80 | — |
| 60% DEA | 5 | — | — | 80 |
| 65% TRIGOL | 5 | 80 | — | — |
| REVDUST ™ | 5 | 20 | 20 | 20 |
| BAROID ® | 10 | 282 | 282 | 282 |
| BDF-570 | 5 | 1 | 1 | 1 |

The rheology and shale retention characteristics of each of CF1, TF7, and TF8 was tested either before or after hot-rolling ("BHR" and "AHR," respectively) at 150° F. (65.56° C.) for 16 hours, according to the method described in Example 2. The results are reported in Table 11.

TABLE 11

| | CF1 | | TF7 | | TF8 | |
|---|---|---|---|---|---|---|
| | BHR | AHR | BHR | AHR | BHR | AHR |
| 600 rpm | 137 | 135 | 118 | 112 | 96 | 100 |
| 300 rpm | 84 | 81 | 70 | 66 | 52 | 54 |
| 200 rpm | 64 | 60 | 53 | 49 | 36 | 40 |
| 100 rpm | 42 | 39 | 34 | 31 | 21 | 24 |
| 6 rpm | 17 | 13 | 12 | 9 | 6 | 5 |
| 3 rpm | 12 | 12 | 11 | 7 | 5 | 4 |
| PV | 53 | 54 | 48 | 46 | 44 | 46 |
| YP | 31 | 27 | 22 | 20 | 8 | 8 |
| LSYP | 7 | 11 | 10 | 5 | 4 | 3 |
| 10-sec gel | 15 | 18 | 13 | 11 | 8 | 8 |
| 10-min gel | 27 | 42 | 22 | 23 | 16 | 20 |
| Electrical Stability | 954 | 1096 | 658 | 686 | 626 | 400 |
| Shale Retention | — | 21.46% | — | 99.80% | — | 96.56% |

As shown, the test fluids exhibit excellent shale retention values and stable rheological properties for use in a subterranean formation operation, such as a drilling operation, even when an organophilic clay is included in the fluid. On the other hand, CF1 exhibited a poor shale retention of only 21.46%, demonstrating the inability to use a clay-based invert emulsion with traditional glycerol formulations. Further, the stability of the invert emulsion test fluids were evaluated at 350° F. and demonstrated effective stability at such high temperatures simulating downhole conditions, which is not observed with CF1, indicating their use in high temperature subterranean formation environments (e.g., greater than about 350° F.).

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    introducing a salt-free invert emulsion into a subterranean formation, wherein the salt-free invert emulsion has an external phase comprising a hydrocarbon fluid, and an internal phase comprising a hygroscopic fluid comprising an amino alcohol comprising n-methyl diethanol amine; and
    performing a subterranean formation operation, wherein the internal phase is about 1% to about 50% by volume of total salt-free invert emulsion, wherein the hygroscopic fluid is diluted with fresh water such that the hygroscopic fluid is about 50% to about 75% by volume of the internal phase of the salt-free invert emulsion, wherein the salt-free invert emulsion has a shale retention greater than about 95%.

2. The method of claim 1, wherein the hygroscopic fluid further comprises a derivative of n-methyl diethanol amine.

3. The method of claim 1, wherein the amino alcohol further comprises a polyol substituted amine derivative.

4. The method of claim 1, wherein the salt-free invert emulsion further comprises an organophilic clay or organophilic lignite.

5. The method of claim 4, wherein the organophilic clay and the organophilic lignite is present in the salt-free invert emulsion in an amount of about 0.1 pounds per barrel to about 15 pounds per barrel of liquid salt-free invert emulsion.

6. The method of claim 5, wherein the organophilic clay and the organophilic lignite is present in the salt-free invert emulsion in an amount of about 1 pound per barrel to about 10 pounds per barrel of liquid salt-free emulsion.

7. The method of claim 1, wherein the salt-free invert emulsion further comprises an additive selected from the group consisting of an emulsifier, lime, a filtration control agent, a viscosifying agent, a suspension agent, a weighting agent, a polymeric sag-control agent, and any combination thereof.

8. The method of claim 1, wherein the subterranean formation operation is a drilling operation.

9. The method of claim 8, wherein the drilling operation comprises a pump coupled to a tubular, wherein the tubular extends from a wellhead and into the subterranean formation.

10. The method of claim 1, wherein the hydrocarbon fluids are selected from the group consisting of alkanes, olefins, aromatic organic compounds, cyclic alkanes, paraffins, diesel fluids, mineral oils, desulfurized hydrogenated kerosenes, and combinations thereof.

11. The method of claim 1, wherein the hygroscopic fluid has a water activity from about 0.3 to about 1.0.

12. The method of claim 1, wherein the hygroscopic fluid has a water activity from about 0.4 to about 0.9.

13. The method of claim 1, wherein the hygroscopic fluid has a water activity from about 0.5 to about 0.8.

14. The method of claim 1, wherein the hygroscopic fluid has a water activity from about 0.6 to about 0.7.

15. The method of claim 1, wherein the hygroscopic fluid further comprises a long chain aliphatic amino alcohol derivative.

16. The method of claim 1, wherein the amino alcohol, the amino alcohol further comprises a long chain aromatic amino alcohol derivative having at least one heteroatom.

17. The method of claim 16, wherein the long chain aromatic amino alcohol derivative comprises from about 2 to about 6 carbon atoms.

18. The method of claim 16, wherein the long chain aromatic amino alcohol derivative comprises from about 3 to about 5 carbon atoms.

19. The method of claim 1, wherein the salt-free invert emulsion further comprises an additive selected from the group consisting of: an inert solid, a dispersion aid, an emulsion thinner, an emulsion thickener, a surfactant, a lost circulation material, a foaming agent, a gas, an alkalinity control additive, a crosslinker, a stabilizer, a scale inhibitor, a friction reducer, a clay stabilizing agent, and any combination thereof.

20. A method comprising:
introducing a salt-free invert emulsion into a subterranean formation, wherein the salt-free invert emulsion has an external phase comprising a hydrocarbon fluid, and an internal phase consisting essentially of fresh water and a hygroscopic fluid comprising an amino alcohol comprising n-methyl diethanol amine; and
performing a subterranean formation operation, wherein the internal phase is about 1% to about 50% by volume of total salt-free invert emulsion, wherein the hygroscopic fluid is diluted with fresh water such that the hygroscopic fluid is about 50% to about 75% by volume of the internal phase of the salt-free invert emulsion, wherein the hygroscopic fluid has a water activity from about 0.3 to about 1.0, wherein the salt-free invert emulsion has a shale retention greater than about 95%.

* * * * *